June 18, 1929.  J. A. WRIGHT  1,717,867
MOTOR CHASSIS
Filed July 26, 1927   2 Sheets-Sheet 1

INVENTOR.
JAMES A. WRIGHT.
ATTORNEY.

June 18, 1929.  J. A. WRIGHT  1,717,867

MOTOR CHASSIS

Filed July 26, 1927  2 Sheets-Sheet 2

INVENTOR.
JAMES A. WRIGHT.
By
ATTORNEY.

Patented June 18, 1929.

1,717,867

UNITED STATES PATENT OFFICE.

JAMES A. WRIGHT, OF MONTREAL, QUEBEC, CANADA.

MOTOR CHASSIS.

Application filed July 26, 1927. Serial No. 208,580.

This invention relates to motor vehicles and particularly to those intended to carry a large number of passengers, of the motor bus type, and having individual wheel suspension.

Its object is to provide an improved form of frame for such vehicles which while giving ample clearance for the transverse spring suspension on the rear wheels, requires only a slight elevation of the floor of the body in that portion of the vehicle.

A further object is to provide a frame in which the differential casings form an important part in its construction and add greatly to its strength and stress resisting character.

A further object is to provide a frame which maintains the driving gear rigidly in position between the flexible axles of the rear wheels.

The invention consists in a pair of channel members with an upwardly offset portion adjacent the rear wheels, connected by cross members mounted underneath the channel members, while the cross members at the other portions are mounted between the channel members.

The floor supported on these cross members rises a very small amount between the raised portions of the channel members and provides a clear and unobstructed passageway through the vehicle.

The differential casings are centrally secured to the lower sides of these underneath cross members and form therewith a very substantial reinforcement to the frame at that portion of it.

Reference is made to the accompanying drawings in which:—

Figure 1:
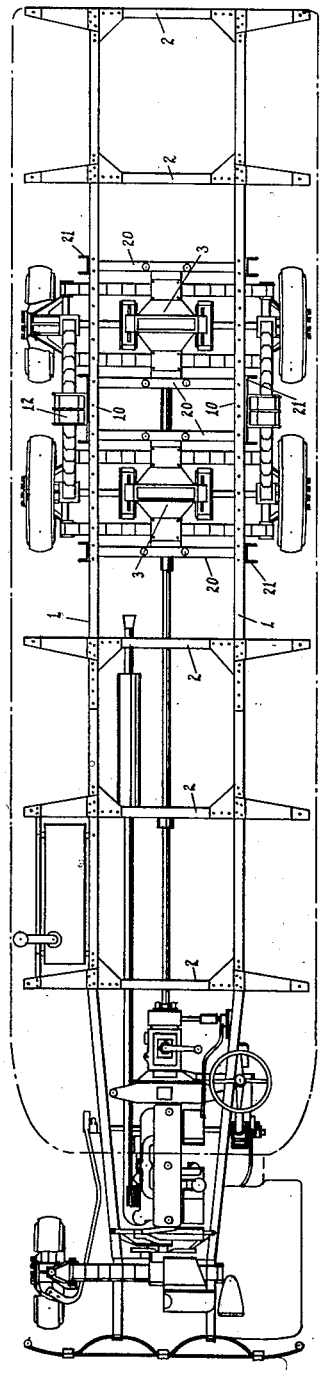
Fig. 1 is a plan view of the frame.
Figure 2:
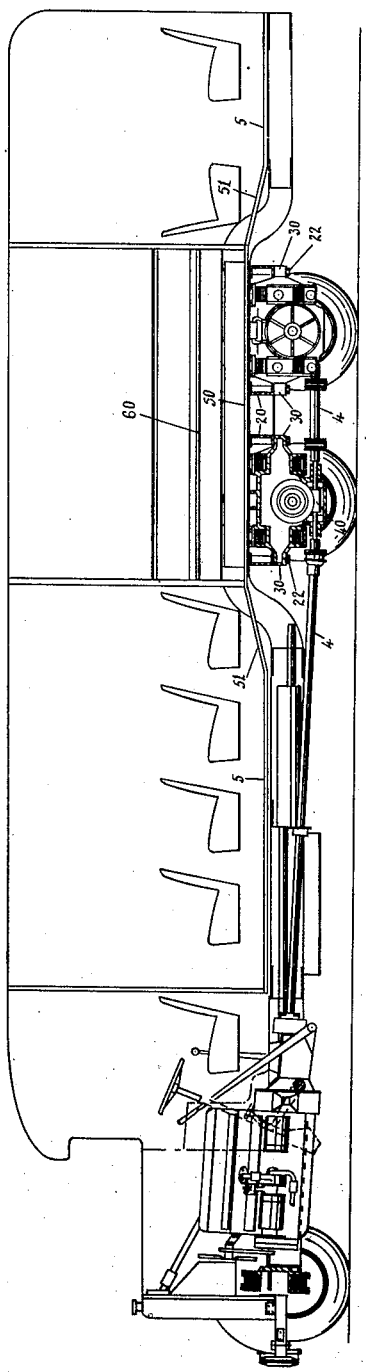
Fig. 2 is a vertical section on the line 2—2 of Fig. 1.
Figure 3:
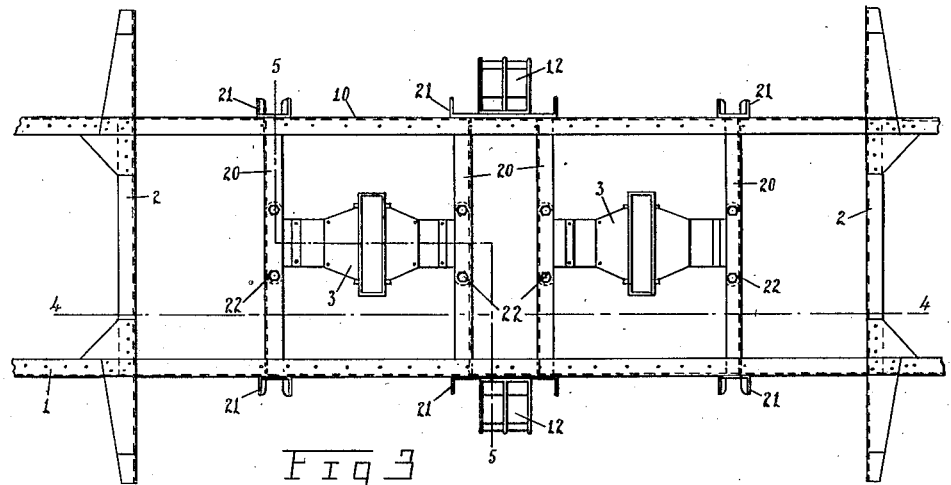
Fig. 3 is a plan view of the section of the frame adjacent the rear wheels.
Figure 4:
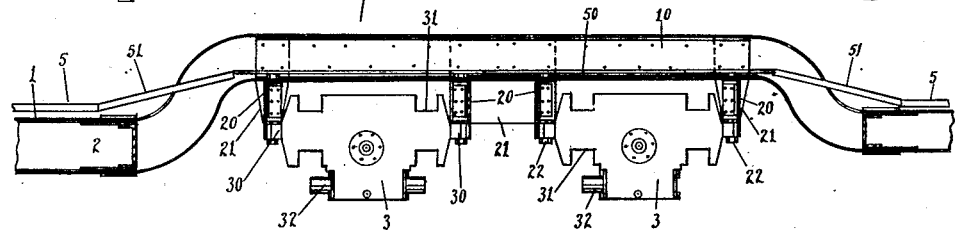
Fig. 4 is a vertical section on the line 4—4 of Fig. 3.
Figure 5:
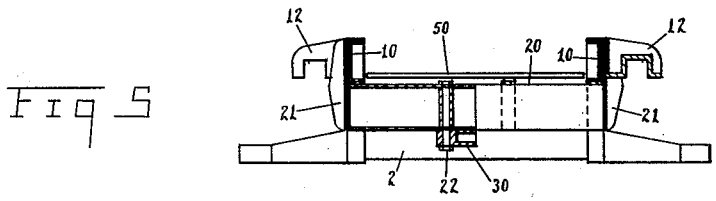
Fig. 5 is a vertical cross section on the line 5—5 of Fig. 3.
Figure 6:
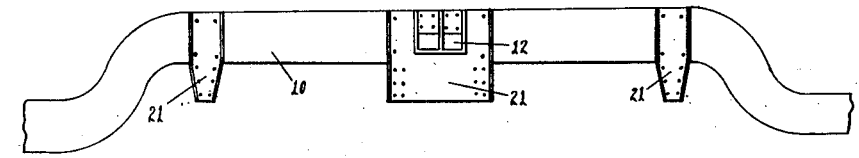
Fig. 6 is a side view.

The channelled side members 1, of the frame which preferably incline inwardly at the front end or section, are upwardly offset at the rear wheel section 10, which are preferably reinforced. A series of cross members 2, connect the channelled side members 1, between these side members, except at the upwardly offset section where a series of cross members 20, secured to brackets 21, run beneath that portion of the side members 10.

These cross members 20, are centrally connected in pairs by the differential casings 3, through the extension brackets 30, which are secured beneath the cross members 20, by the bolts 22.

The casings 3, provide the spring seats 31, for the spring suspenion and also the bearings 32, for the worm drives 40, of the main drive shaft 4.

The floor 5, supported on the side members 1, and the cross members 2, rises by the inclines 51, to the section 50, supported on the cross members 20, between the offset sections 10, seats 60, are provided running lengthwise over the sections 10.

Central side brackets 12, provide seats for the overload springs, outside the frame.

With this construction a frame is provided for a long passenger vehicle having great strength and resistance to torsional stress in the section adjacent the driving mechanism, while the differential casings with their driving shaft bearings are held rigidly to the frame and give steady and secure seats for the transverse springs of the spring suspension on the flexible axles of the wheels.

The car body has a low level floor with but a slight rise over the rear wheel drive section and gives a clear and unobstructed passageway throughout the car body.

What I claim is:—

1. In a device of the class specified, a frame comprising side channel members, upwardly offset adjacent the rear wheels, with channel cross members beneath the offset section, and cross members between the side members in the other sections of the frame, and a floor supported on the cross members.

2. In a device of the class specified, a frame and a floor supported on such cross members with inclined portions connecting the higher level with the lower level.

3. In a device of the class specified, a frame comprising side channel members, upwardly offset adjacent the rear wheels, with brackets secured to the outside of the side members at the offset portion, channel cross members mounted underneath the offset portion of the side members, and secured to the side brackets.

4. In a device of the class specified, a frame comprising side channel members, upwardly offset adjacent the rear wheels, with brackets secured to the outside of the side members at the offset portion, channel cross members mounted underneath the offset portion of the side members, and secured to the side brackets, and differential casings centrally mounted between such cross members.

JAMES A. WRIGHT.